(12) United States Patent
Casper et al.

(10) Patent No.: US 6,973,529 B2
(45) Date of Patent: Dec. 6, 2005

(54) MULTIPLE I/O PATH SELECTION AMONG DISPARATE CHANNEL PATHS

(75) Inventors: Daniel F. Casper, Poughkeepsie, NY (US); Kenneth J. Oakes, Wappingers Falls, NY (US); John S. Trotter, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 09/966,434

(22) Filed: Sep. 28, 2001

(65) Prior Publication Data

US 2003/0065871 A1 Apr. 3, 2003

(51) Int. Cl.[7] .............................................. G06F 13/00
(52) U.S. Cl. ...................... 710/316; 710/38; 709/239
(58) Field of Search ............................... 710/316, 317, 710/36–42; 709/229, 238–244

(56) References Cited

U.S. PATENT DOCUMENTS

| | | | |
|---|---|---|---|
| 4,873,517 A | 10/1989 | Baratz et al. | 340/825.03 |
| 5,233,604 A | 8/1993 | Ahmadi et al. | 370/60 |
| 5,335,224 A | 8/1994 | Cole et al. | 370/84 |
| 5,497,371 A | 3/1996 | Ellis et al. | 370/60 |
| 5,923,656 A | 7/1999 | Duan et al. | 370/395 |
| 5,940,372 A | 8/1999 | Bertin et al. | 370/238 |
| 5,959,993 A | 9/1999 | Varma et al. | 370/397 |
| 5,970,050 A | 10/1999 | Johnson | 370/238 |
| 6,014,367 A | 1/2000 | Joffe | 370/230 |
| 6,072,797 A | 6/2000 | Fletcher | 370/394 |
| 6,072,800 A | 6/2000 | Lee | 370/412 |
| 6,075,791 A | 6/2000 | Chiussi et al. | 370/412 |
| 6,111,877 A | 8/2000 | Wilford et al. | 370/392 |
| 6,516,390 B1 * | 2/2003 | Chilton et al. | 711/138 |
| 6,574,667 B1 * | 6/2003 | Blumenau et al. | 709/229 |
| 6,704,812 B2 * | 3/2004 | Bakke et al. | 710/38 |
| 2002/0018477 A1 * | 2/2002 | Katz | 370/401 |
| 2002/0147841 A1 * | 10/2002 | Lee | 709/241 |
| 2003/0191892 A1 * | 10/2003 | Fujimoto et al. | 711/114 |

OTHER PUBLICATIONS

IBM Technical Disclosure Bulletin, vol. 39, No. 04, Apr. 1996 Weighted Queueing Algorithm for Efficient Asynchronous Transfer Mode Traffic Shaping, D. F. Barton and R. E. Schroter, pp. 161-163.

* cited by examiner

Primary Examiner—Khanh Dang
Assistant Examiner—Clifford Knoll
(74) Attorney, Agent, or Firm—Lily Neff; Andrew Wojnicki, Jr.; Cantor Colburn LLP (57) ABSTRACT

An apparatus, method and program product for selecting paths between a main memory and I/O devices in a data processing system having a main memory for storing data, one or more I/O devices for receiving data from or sending data to the main memory, and an I/O processor (IOP) for controlling I/O operations for sending data between the main memory and the I/O devices. The data processing system includes disparate channels between the IOP and the I/O devices. The disparate channels carry data between the main memory and the I/O devices during the I/O operations. Included is a computer program executed by the IOP for assigning a path weight to selected ones of the disparate channel paths to be used in selecting the next channel path to carry data between the main memory and I/O devices. Each disparate channel type has a different set of criteria for evaluating the path weight.

12 Claims, 6 Drawing Sheets

FIG. 1

| WORD OFFSET | BIT | DESCRIPTION | INITIAL SETTING BY IOP | VALUE STORED BY CHN |
|---|---|---|---|---|
| 0 | 0-7 | SEQUENCE NUMBER | 0 | SEQUENCE # |
| | 8-15 | AVAILABLE EXCHANGES | 0 | AVAILABLE LCs |
| | 16-31 | TOTAL QUEUED IN CHANNEL | 0 | TOTAL QUEUED |
| 1 | 0-7 | CONTROL BLOCK CODE | 0xFC | 0xFC |
| | 8 | CONTROL BLOCK CODE QUALIFIER | 0 | 0 |
| (IOP WILL SET FOR zSERIES ONLY! ZERO, OTHERWISE) | 9-12 | RESERVED | 0 | 0 |
| | 13 | CHN UNAVAILABLE (NOT USED) | 0 | 0 |
| | 14 | CHN ALLOWED TO STORE INTO AREA | 1 | 1 |
| | 15 | CHN DID STORE INTO AREA | 0 | 1 |
| | 16-23 | CHID | CHID | CHID |
| | 24-31 | RESERVED | 0 | 0 |
| 2-17 | 2x256 | 2 BITS PER PORT QUEUE COUNTERS | 0 | SET PER PORT |
| 18-31 | | RESERVED - FOR EITHER CHN OR IOP (JUST IN CASE) | 0 | DON'T STORE ANYTHING |

FIG.2

| WORD OFFSET | BIT | DESCRIPTION | INITIAL SETTING BY IOP | VALUE STORED BY CHN |
|---|---|---|---|---|
| 0 | 0–7 | SEQUENCE NUMBER | 0 | SEQUENCE # |
|  | 8–15 | AVAILABLE EXCHANGES | 0 | AVAILABLE EXCH. |
|  | 16–31 | TOTAL QUEUED IN CHANNEL | 0 | TOTAL QUEUED |
| 1 | 0–7 | CONTROL BLOCK CODE | 0xFC | 0xFC |
|  | 8 | CONTROL BLOCK CODE QUALIFIER | 0 | 0 |
|  | 9–12 (IOP WILL SET FOR zSERIES ONLY! ZERO, OTHERWISE) | RESERVED | 0 | 0 |
|  | 13 | CHN UNAVAILABLE (NOT USED) | 1 | 1 |
|  | 14 | CHN ALLOWED TO STORE INTO AREA | 0 | 1 |
|  | 15 | CHN DID STORE INTO AREA | CHID | CHID |
|  | 16–23 | CHID | 0 | SET TO 1 IF REACHED |
|  | 24 | DMA STORAGE REQUEST QUEUE THRESHOLD REACHED | 0 | 0 |
|  | 25–31 | RESERVED | 0 | 0 |
| 2–31 |  | RESERVED – FOR EITHER CHN OR IOP (JUST IN CASE) |  | DON'T STORE ANYTHING |

| WORD OFFSET | BIT | DESCRIPTION | INITIAL SETTING BY IOP | VALUE STORED BY IOP |
|---|---|---|---|---|
| 0 | 0-7 | SEQUENCE NUMBER | 0 | SEQUENCE # |
| | 8-15 | RESERVED | 0 | 0 |
| | 16-31 | TOTAL QUEUED IN CHANNEL | 0 | TOTAL QUEUED |
| 1 | 0-7 | CONTROL BLOCK CODE | 0xFC | 0xFC |
| (IOP WILL SET FOR zSERIES ONLY! ZERO, OTHER- WISE) | 8 | RESERVED | 1 | 1 |
| | 9-13 | | 0 | 0 |
| | 14 | IOP ALLOWED TO STORE INTO AREA | 1 | 1 |
| | 15 | IOP DID STORE INTO AREA | 0 | 1 |
| | 16-23 | CHID | CHID | CHID |
| | 24-31 | RESERVED | 0 | 0 |
| 2-9 | 1x256 | IOP_Q2BUSY | 0 | SET PER PORT |
| 10-17 | 1x256 | IOP_Q1BUSY | 0 | SET PER PORT |
| 18-25 | 1x256 | IOP_PREVQBUSY | 0 | SET PER PORT |
| 26-31 | | RESERVED | 0 | 0 |

| WORD OFFSET | BIT | DESCRIPTION | INITIAL SETTING BY IOP | VALUE STORED BY IOP |
|---|---|---|---|---|
| 0 | 0-7 | SEQUENCE NUMBER | 0 | SEQUENCE # |
|  | 8-15 | RESERVED | 0 | 0 |
|  | 16-31 | TOTAL QUEUED IN CHANNEL | 0 | TOTAL QUEUED |
| 1 (IOP WILL SET FOR zSERIES ONLY; ZERO, OTHERWISE) | 0-7 | CONTROL BLOCK CODE | 0xFC | 0xFC |
|  | 8 | CONTROL BLOCK CODE QUALIFIER | 1 | 1 |
|  | 9-13 | RESERVED | 0 | 0 |
|  | 14 | IOP ALLOWED TO STORE INTO AREA | 1 | 1 |
|  | 15 | IOP DID STORE INTO AREA | 0 | 1 |
|  | 16-23 | CHID | CHID | CHID |
|  | 24-31 | RESERVED | 0 | 0 |
| 2-31 |  | RESERVED | 0 | 0 |

FIG.5

| BIT | DESCRIPTION | FCV | FC | NON-FICON |
|---|---|---|---|---|
| 0-1 | | | 0 | 0 |
| 2 | NUMBER OF STARTS QUEUED TO PORT -OR- BUSYNESS OF CHANNEL | CHN_QCOUNT(PORT) + IOP_Q1BUSY(PORT) + IOP_Q2BUSY(PORT) (TOTAL NUMBER OF STARTS QUEUED TO THE PORT) | FC_UMAXSTOREREQS + "AEX". NOTE: TO COMPUTE AEX: IF AVAILABLEEXCHANGES = 0, THEN "AEX" = 1. OTHERWISE, "AEX" = 0 | ONE DEEP QUEUE BIT FROM VECTOR. FOR PRE-zSERIES, SET BIT TO 0 |
| 3 | | | | CHANNEL BUSY VECTOR BIT |
| 4 | LINK INIT REQ'D | IF LINK INIT REQUIRED, SET BIT TO 1 | | |
| 5 | PREVIOUSLY QUEUED START | IOP_PREVQBUSY(PORT) | 0 | |
| 6 | DESTINATION PORT BUSY | | | 0 |
| 7 | CHANNEL HARDWARE AVAILABILITY | IF AVAILABLEEXCHANGES = 0, SET BIT TO 1. OTHERWISE, SET TO 0 | "AEX" -OR'D WITH - FC_MAXSTOREREQS | CHANNEL BUSY VECTOR BIT |
| 8-13 | RESERVED | 0 | 0 | 0 |
| 14 | UNKNOWN PATHWEIGHT STATE | IF FICON PATH NOT STORING STATISTICS IN HSA (FC/FCV_STATSACTIVE = 0), SET THIS BIT TO 1. FOR PRE-zSERIES NON-FICON PATHS: IF PATH IS ON ANOTHER IOP -OR- THE CHANNEL BUSY VECTOR IS ON, SET THIS BIT TO 1 | | |
| 15 | FAVOR PREFERRED PATH | SET TO 1 IF PREFERRED PATH BIT IS ON & THIS PATH IS NOT PREFERRED PATH | | |
| 16-31 | TOTAL QUEUED IN CHANNEL | FCV_TOTALQUEUED + IOP_TOTALQUEUED | FC_TOTALQUEUED + IOP_TOTALQUEUED | CHANNEL BUSY VECTOR BIT x 8 |

FIG. 6

MULTIPLE I/O PATH SELECTION AMONG DISPARATE CHANNEL PATHS

FIELD OF THE INVENTION

The present invention relates to selection of multiple I/O paths in a data processing system having channel paths, and more particularly relates to multiple I/O path selection processors to optimize path selection among disparate I/O channel paths connected to an I/O device.

BACKGROUND OF THE INVENTION

Path selection is the process of the I/O Subsystem (IOSS) picking a channel path candidate that has connectivity to a specified device and is likely to begin execution or queue an I/O request typically associated with a Start Subchannel (SSCH) instruction. In one IOSS implementation, there could be up to eight channel paths connected between the IOSS and the device that the IOSS can select a path from. Also, within an IOSS could be one or more I/O Processors (IOPs) which select paths, each having its own set of channel paths from which it is able to choose during path selection. Thus, within the grouping of paths having connectivity to the particular device from which the IOSS can choose from, called a Logical Control Unit (LCU), one or more of the channel paths has affinity to only one IOP.

When the Operating System (OS) issues a SSCH, the device's subchannel control block (SCB) containing the SSCH function gets queued by one of the Central Processors (CP) on one of the IOP's work queues (WQ) within the IOSS. It would then be up to that IOP to decide whether or not the channels within the LCU are available to initiate the channel program associated with the SSCH. If the path under consideration was too busy, the IOP would examine the next path in round robin rotation order.

The starting point for picking the first path candidate to examine is based on the prior art Next Path field set into the device's subchannel control block (SCB) from a previous path selection attempt. Thus, when an IOP dequeues an SCB from the work queue, it looks at the Next Path field to determine which path to start evaluating and, if necessary, continues in a round robin rotation to examine other paths candidates. If the IOP encounters a path that has affinity to another IOP, the Next Path field in the SCB would be set to that path and the SCB would be enqueued on that IOP's WQ without consideration of the state of the channel paths with affinity to that other IOP since it was costly in terms of hardware performance to get the state of these paths. Thus, the SCB could possibly be re-enqueued multiple times on various IOP's WQs before a viable path was selected. Once an IOP finally selected a viable candidate path and signaled the channel path to initiate the SSCH request, if the SSCH got queued behind a long data transfer intensive channel program, the channel would have to return the SSCH to the IOP and it would be up to the IOP to go through path selection all over again. Thus, if the selected path turned out to be a bad choice, all this extra overhead of potentially ping ponging among IOPs could end up adversely affecting I/O throughput performance.

In prior art, determining the busy state of an ESCON or parallel channel is done by having the channel turn on a busy indicator when the channel is busy transferring data. Also, the prior art channels have a one deep queue for the entire channel. The one deep queue makes it possible to send the SSCH request to the channel when the channel is busy and the channel will queue the SSCH in the channel rather than returning it to the IOSS. Once the one deep queue is full, any new SSCHs would get returned to the IOSS.

With the introduction of the IBM zSeries machine, the one deep queue state could be observed during Path Selection. The IOP would read the Busy Bit first. If the Channel Busy Bit was off, the IOP would select that path or continue to round robin until it found a channel with the busy bit off. If the IOP couldn't find a non-busy channel, it would randomly pick a channel path in the hopes of the one deep queue not being full. Wrong guesses resulted in returned SSCH's.

When the FICON Bridge (FCV) channel was introduced, the shortcomings of the above methods became very noticeable and the first problem to be addressed for the I/O subsystem (IOSS) to select the least busy FCV channel path connected between the IOSS and a device given the uniqueness of the FCV channel. What makes the FCV channel unique in terms of path selection is its properties that make it more difficult to tell how busy the channel is. One feature is its ability to run up to eight possible I/O operations tightly interleaved on the same channel path by using special exchange hardware. Another unique feature of the FCV channel is having lots of internal queues—one queue for each of the 256 possible ports with each port queue capable of queuing up to three SSCHs to different devices. Thus, the determination of just how busy the channel is becomes more difficult than using the prior art methods described above. The prior art busy indicator would be on even though the FCV channel was capable of queuing and interleaving a lot more work.

In addition, the FCV channel has an IBM ESCON interface and can be connected to control units (connected to devices) that are also attached to prior art ESCON channels connected to the same IOSS. This makes the determination of the best candidate more difficult due to the varying characteristics of these channel types.

A new method is needed to give the IOSS the ability to determine how busy the FCV channel really is given that there are several pieces of data that could be measured based on the current implementation in the FCV channel. This data is referred to as the Channel Busy State Data (CBD) listed in priority order (highest to lowest):

1. Queue Length of one of the desired 256 Port Queues. Up to three pending I/O operations (SSCHs) could be queued on the Port Queue. If the Port Queue was full, any more SSCHs issued to the channel on this particular port would be returned to the IOSS.
2. Available Exchanges. At least one of the eight exchanges would need to be available to drive I/O. Otherwise, the SSCH would not be de-queued from the specific Port Queue.
3. Total Queue Length. Total of all of the SSCH queued on all the Port Queues plus special SSCHs used in TPF mode not tied to a specific port. If a SSCH remains on the queue for a "long" time, it will be returned to the IOSS.

A new method was needed to fairly balance the work load on paths to the device given the disparate characteristics of the different channel paths—in this case, having both FCV channels and prior art ESCON channels connect ed to the same device. It is desirable to be able to use all the available paths to the fullest extent without overloading any particular path.

Also, the new FICON Native (FC) channels were required to be added in the same LCU as the FCV and ESCON channels. The FC channels have yet a different set of Channel Busy State Data:

1. DMA Storage Request Queue Threshold reached: When reached, the channel will not drive any new starts since the number of outstanding storage requests is high enough to cause a performance degradation. SSCHs will remain on the channel's main queue until this condition subsides.
2. Available Exchanges. At least one of the 32 exchanges would need to be available to drive I/O. Otherwise, the SSCH would not be dequeued from the channel's main queue.
3. Total Queue Length. Total of all of the SSCH queued on all the Port Queues plus special SSCHs used in TPF mode not tied to a specific port.

SSCHs that remains on the queue for an implementation dependent "long" time, will be returned to the IOSS.

Another problem in the current path selection algorithm that was mentioned above occurs when a candidate is on another IOP. Prior to this design, when an IOP determined that the next path to be considered had affinity to another IOP, this IOP would blindly queue the device's subchannel control block (SCB) on the other IOP work queue even though other paths on the current IOP may have been available to use. Even if the state of the path having affinity to another IOP could be known with minimal cost prior to re-enqueuing the SCB, that path could have changed to a busy state potentially causing the problem of excessive re-enqueues to other IOPs work queues.

Another problem are cases when all the available PathWeight information suggests that the selected path is not a Bad Candidate, but the SSCHs still get returned by the channel after the path was selected. For example, a "long" data pushing channel program could tie up the channel making it impossible for the channel to start up any new work. Rather than let the work sit on its queues for a "long" time, the channel will return SSCHs that have been sitting on it's queues for a set amount of time. We needed a way to avoid picking that path over again after the SSCH was returned to the IOSS and give other candidates a more favorable PathWeight during the next path selection attempt for the returned SSCH.

SUMMARY OF THE INVENTION

The present invention provides for Mixing Disparate Channel paths connected to the same device.

The present invention provides that each FCV channel store all the CBD into an area in storage (called Hardware System Area (HSA)), that is accessible to the IOSS and channels, but not accessible to customer programs. Each FCV channel has a designated HSA area that it stores the CBD into at a fixed periodic interval in the one to two millisec range. The IOSS could then examine CBD for each valid candidate during path selection. However, the channel stored CBD would not be enough. If, for example, several SSCH were issued for the same port within the one to two millisec interval, the channel copy of the CBD data would not be updated in time to reflect each of the SSCHs issued by the IOSS. This could cause the three deep port queue within the channel to overflow causing the channel to return the extra SSCHs to the IOSS. In the present invention, the IOSS keeps its own copy of the CBD data that it increments every time it sends a SSCH to the FCV channel. The IOSS combines the Channel CBD with the IOSS CBD in determining the CBD used in path selection decisions. To synchronize the channel CBD with the IOSS CBD, a sequence number is kept as part of the CBD. When the channel stores its CBD, it increments the sequence number in its CBD. When the IOSS finds the sequence number in the channel CBD is greater than the sequence number in the IOSS copy of the CBD, it zeros out the IOSS CBD and sets the IOSS CBD sequence number equal to the channel CBD sequence number. This interlock prevents overloading the port queues as well as preventing the IOSS CBD from not getting updated.

The present invention also provides for assigning each path a PathWeight since some of the CBD are more important than others (i.e. the total queue length of all the channels queues was less important in selecting a path than the total queue length for the port to drive the start on). PathWeight is the value assigned to a path that is compared to other PathWeights for other paths in the LCU. The lower the PathWeight, the more desirable the path for path selection. The PathWeight is formulated from the CBD based on the priority of the CBD. While going through path selection, the IOSS determines a PathWeight for a particular path. If it is lower than lowest PathWeight that was set into a field called the OptimalPathWeight, it replaces OptimalPathWeight with the PathWeight of the path currently being evaluated. Now the current path becomes the OptimalPath associated with the new OptimalPathWeight.

The present invention also provides that the IOP categorize the OptimalPathWeight in one of three groups based on the value: Great, OK and Bad (low to high PathWeight). A Great Candidate is selected immediately to drive the SSCH. A Great Candidate is a path that could drive the SSCH almost immediately. Thus, it is not worth the extra processing time to find a better candidate. An OK Candidate is capable of queuing the SSCH and could possibly drive it. However, the OK Candidates PathWeight is further compared against the PathWeights of other candidates evaluated in round robin order to come up with the best candidate to select. A Bad Candidate is one likely to return the SSCH should it be selected. Thus, the Bad Candidate is rejected from consideration and never made an OptimalPath. The PathWeight Table in the attached detailed design document shows how the PathWeight is divided among the three groups.

The present invention further provides that the starting point for picking the first path candidate to evaluate be still based on the Next Path field set into the device's subchannel control block (SCB). By rotating the starting point, every path in the LCU is allowed to at least get a look should there be many Great Candidates as could be in a lightly loaded system. When a path is finally picked to initiate the SSCH, a counter in the LCU is incremented and that value is stored in the SCB Next Path field. Thus, some rotation on a control unit basis is achieved during path selection.

The present invention also provides that the Channel Busy Bit and One Deep Queue data are also used to formulate a PathWeight. The positioning of the bits in the PathWeight along with adjusting the PathWeight with a weighing factor makes it possible to easily compare an ESCON channel PathWeight to an FCV channel PathWeight during IOSS path selection.

The present invention further provides for a PathWeight Table to optimally select a channel among a mix of channels types of differing performance characteristics connected to a device. In addition, the new FICON Native Channel (FC) also stores CBD in HSA which is also PathWeighted so it can be compared to other channel types within the same LCU.

The present invention also provides a path selection algorithm providing that all paths on the current IOP will be weighed first and, only if all the paths on this IOP are Bad Candidates, provides that the SCB be re-enqueued to another IOPs work queue.

The present invention also provides that in determining which other IOP's work queue to choose, path selection first finds the best candidate group and then picks the path within the group having affinity to the least utilized IOP. This is done by first capturing the same information about each of the candidate paths on the other IOP's and formulating and comparing PathWeights as described above. Any IOP has the ability to read any other channels CBD in HSA.

The present invention also provides that the ESCON and Parallel Channels' Busy and One Deep Queue Bits be read with little performance cost, and if any Great Candidates with affinity to other IOPs are found, it will be among this group of paths that will be examined to select an IOP with the least number of elements on its work queue for the SSCH to be queued to. If there are no Great Candidates, it will be among the OK Candidates that will be used to select an IOP with the least number of elements on its work queue for the subchannel to be queued to.

The present invention further provides that if all the paths on other IOPs are Bad Candidates, the IOP's work queue that has the least number of elements on it, including the IOP currently processing the SSCH, will be the one chosen to queue the subchannel on.

The present invention also provides for not selecting paths that were previously selected within the context of the same SSCH until all other paths have been considered for path selection. A path mask is maintained in the device's subchannel control block (SCB) called the SCHNBSY mask which is initialized to zero at the beginning of a new SSCH by the IOSS. A bit corresponding to the path in the LCU is turned on when a path is selected to drive the SSCH. If that SSCH is returned, those paths that have bits on in SCHN-BSY are treated as Bad Candidates during the new Path Selection attempt for the same SSCH that was returned. It is only until the PathWeights for all remaining paths show them as Bad Candidates will SCHNBSY get reset so all paths in the LCU will now be allowed to be weighted and considered during path selection.

A performance advantage is obtained by having better IOP and Channel utilization in terms of less waste redriving the same SSCHs and better balance among IOPs and Channels. By more effectively selecting paths by having more information about the state of the path causes less SSCH requests to be returned to the IOSS. Thus, less IOP and Channel utilization is wasted.

By trying to find the best path on this IOP first rather than blindly re-enquing the SSCH on the next path in rotation order, costly re-enqueuing is saved and less IOP utilization is wasted.

By factoring in the state of the paths having affinity to other IOPs when required to select a path having affinity to another IOP, there is less likelihood of picking IOPs with Bad Candidates resulting in less ping-ponging of the SSCHs among the various IOPs.

By factoring in the IOP work queue length when selecting a path with affinity to another IOP, there is a more balanced work load among the IOPs.

By picking Great Candidates over just OK candidates, less utilized channels will be more utilized resulting is more balanced utilization among channels within the LCU regardless of each channel's performance capability.

By not overutilizing a channel via PathWeighting, there is less likelihood that SSCHs will be returned to the IOSS due to being on the queue too long. Also, the channel doesn't get bogged down with returning SSCHs.

By screening out candidates that were selected to drive the SSCH that were returned within the context of the same SSCH, breathing time is given to the channel so it can complete its current work. This helps reduce the likelihood that SSCH's will get returned by the channel.

By formulating and/or adjusting the PathWeight for a channel path based on capacity and channel type, it is possible to effectively mix channel types of varying capacity within the same LCU and have the less utilized paths get more work to do.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
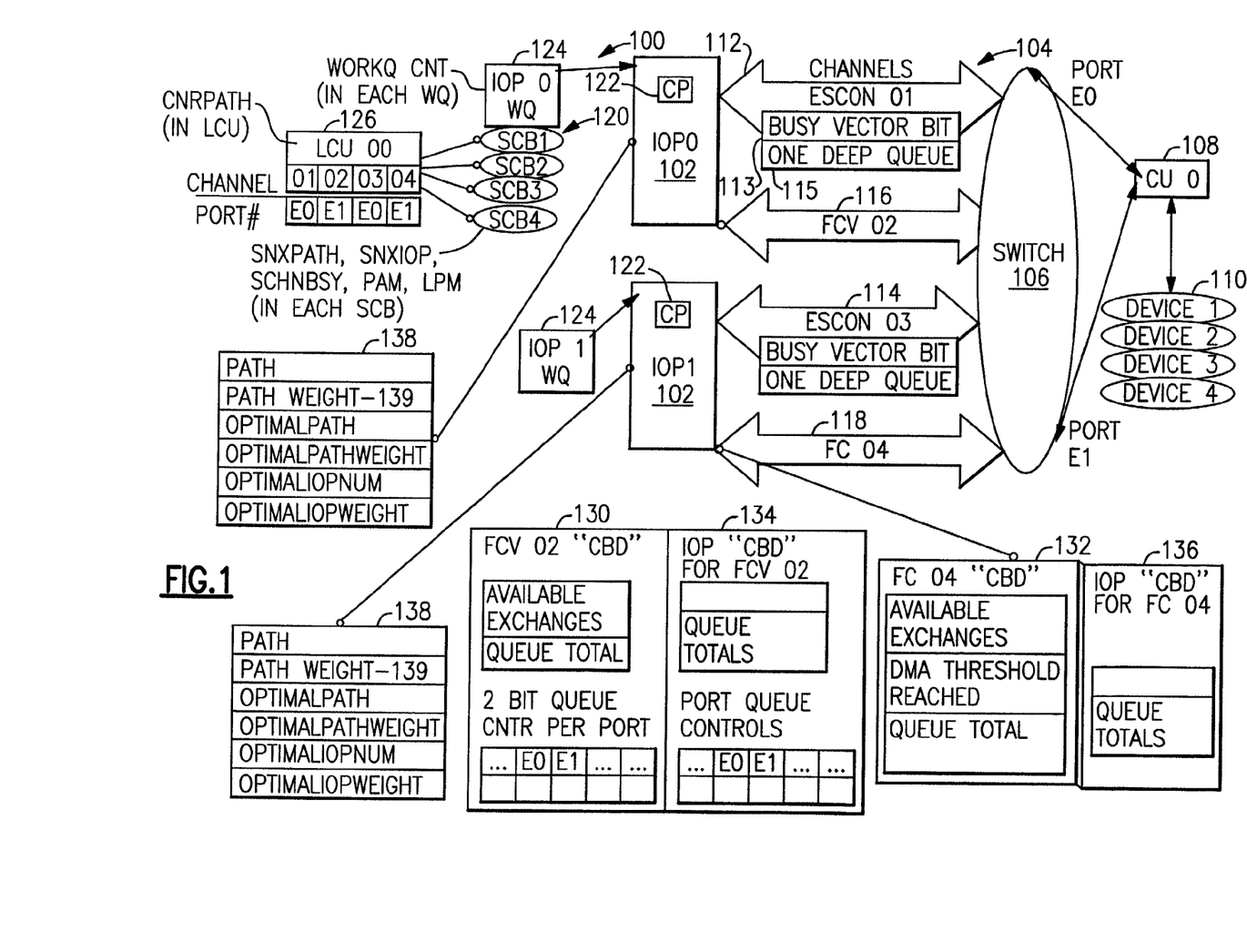
FIG. 1 is a schmetic diagram of a data processing system including the present invention.

FIG. 1 is a schematic diagram showing an I/O subchannel (IOSS)100 having I/O processors (IOPs) 102 connected through channels 104 and a switch 106 to control units 108 controlling one or more devices 110. It will be understood that the configuration of FIG. 1 is an example, and that various components and number of components of the system may vary, as desired. For instance, only one control unit 108 is shown for clarity. However, the number may be increased, as understood by those skilled in the art.

The channels 104 may include ESCON channels 112 and 114, Ficon Bridge (FCV) channels 116, or Ficon Native channels (FC) 118, all available from the International Business Machines Corporation, Armonk, N.Y. The IOSS 100 includes multiple Subchannel Control Blocks (SCB) 120 containing Start Subchannel (SSCH) instructions which are queued by one of the Central Processors (CP) 122 on one of the Work Queues (WQ) 124 within the IOSS 100. As previously explained, each IOP 102 has its own set of channel paths from which it is able to choose during path selection. Within the grouping of paths having connectivity to a particular device from which the IOSS 100 can choose, called a Logical Control Unit (LCU) 126, one of more of the channel paths has affinity to only one IOP 102. Each LCU 126 keeps a table of channel paths and includes the channel numbers assigned to the channels 104, and the ports of the switch 106 through which the channels 104 are connected to the control unit 108. LCU 126 also keeps an LCU Next Path Index (CNRPATH) that was set into an SCB's Next Path (SNXPATH) field while processing a previous SSCH instruction. Each SCB 120 also keeps an indication of SubChannel Busy (SCHNBSY), PAM, LPM and Next IOP (SNXIOP). The PAM and LPM are well understood in the art, are fully explained in the IBM z/Architecture Principles of Operation SA22-7832-00 available from IBM, and will not be discussed further.

Figure 2:
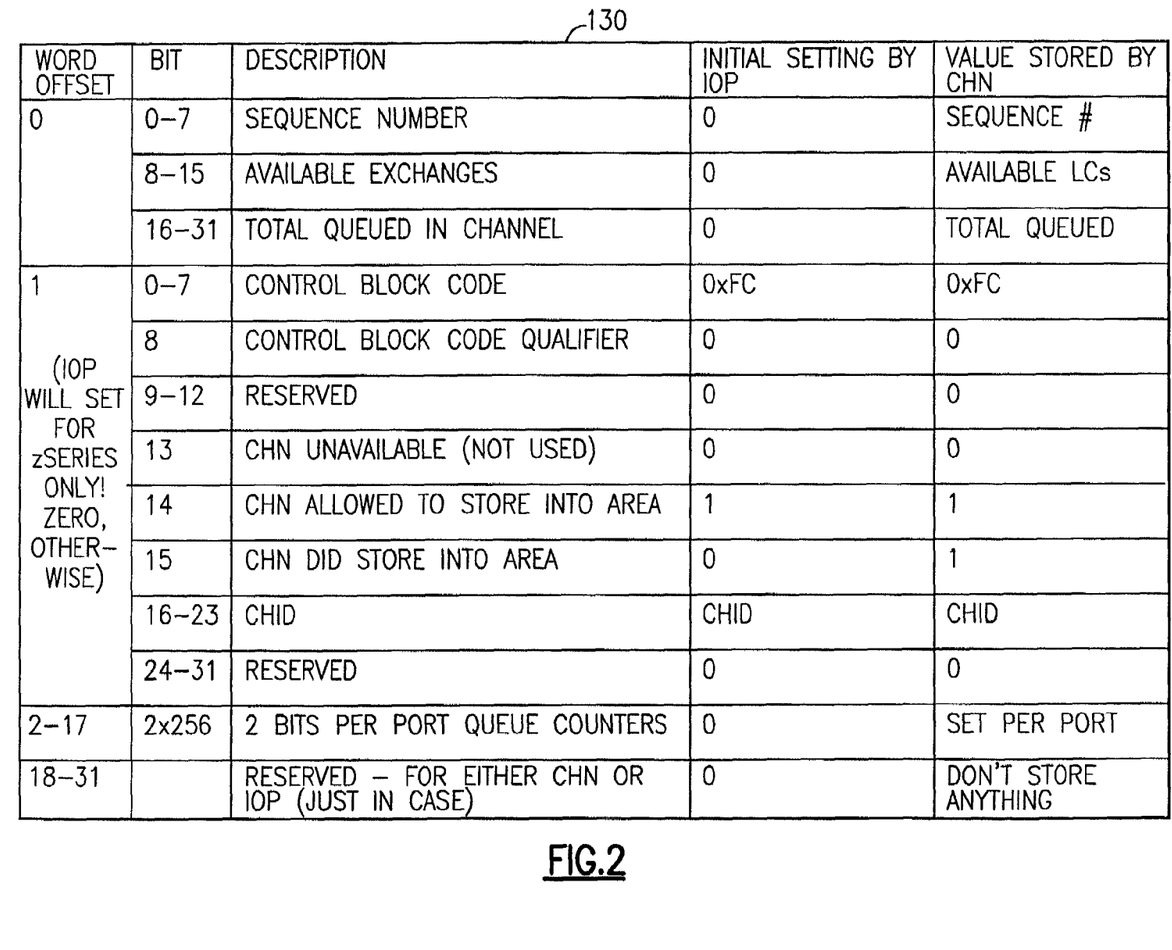
FIG. 2 is a diagram of a table of Channel Busy Vector area for FCV which is stored by an IOP of the system of FIG. 1.
Figure 3:
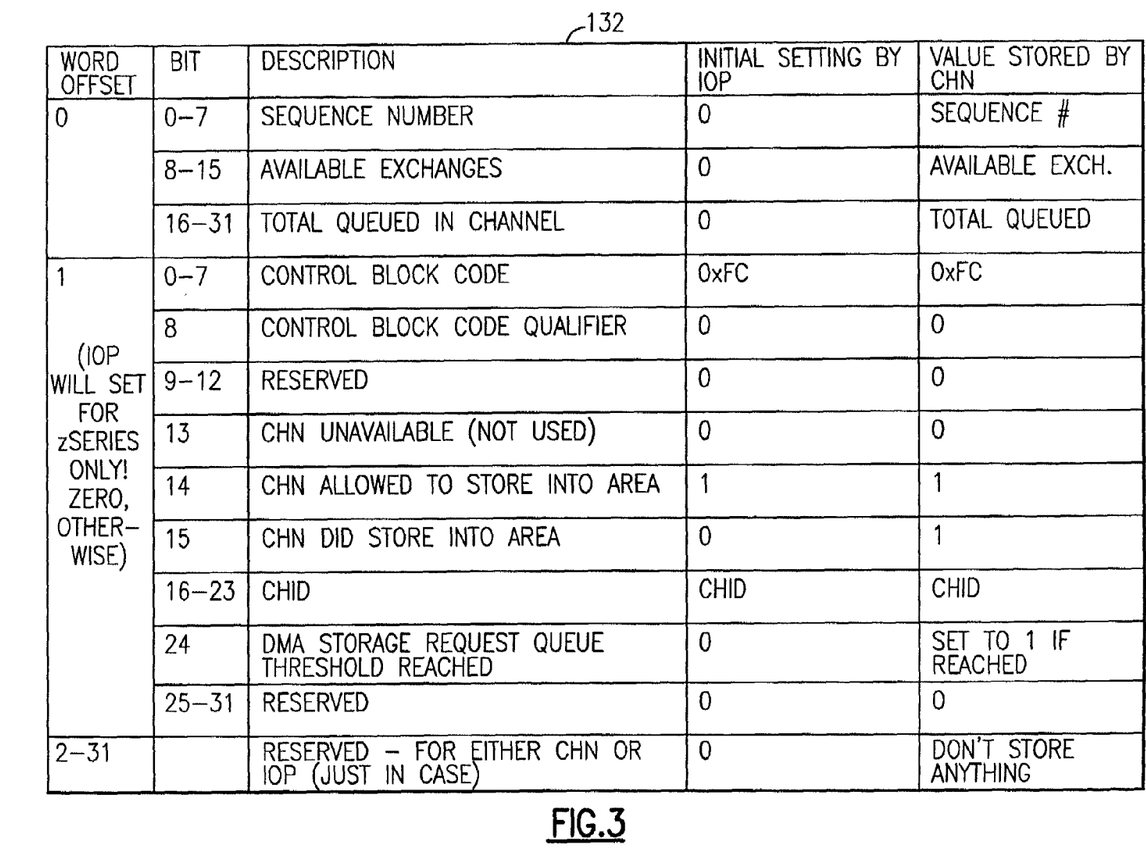
FIG. 3 is diagram of a table of a Channel Busy area for FC which is maintained by a channel of the system of FIG. 1.
Figure 4:
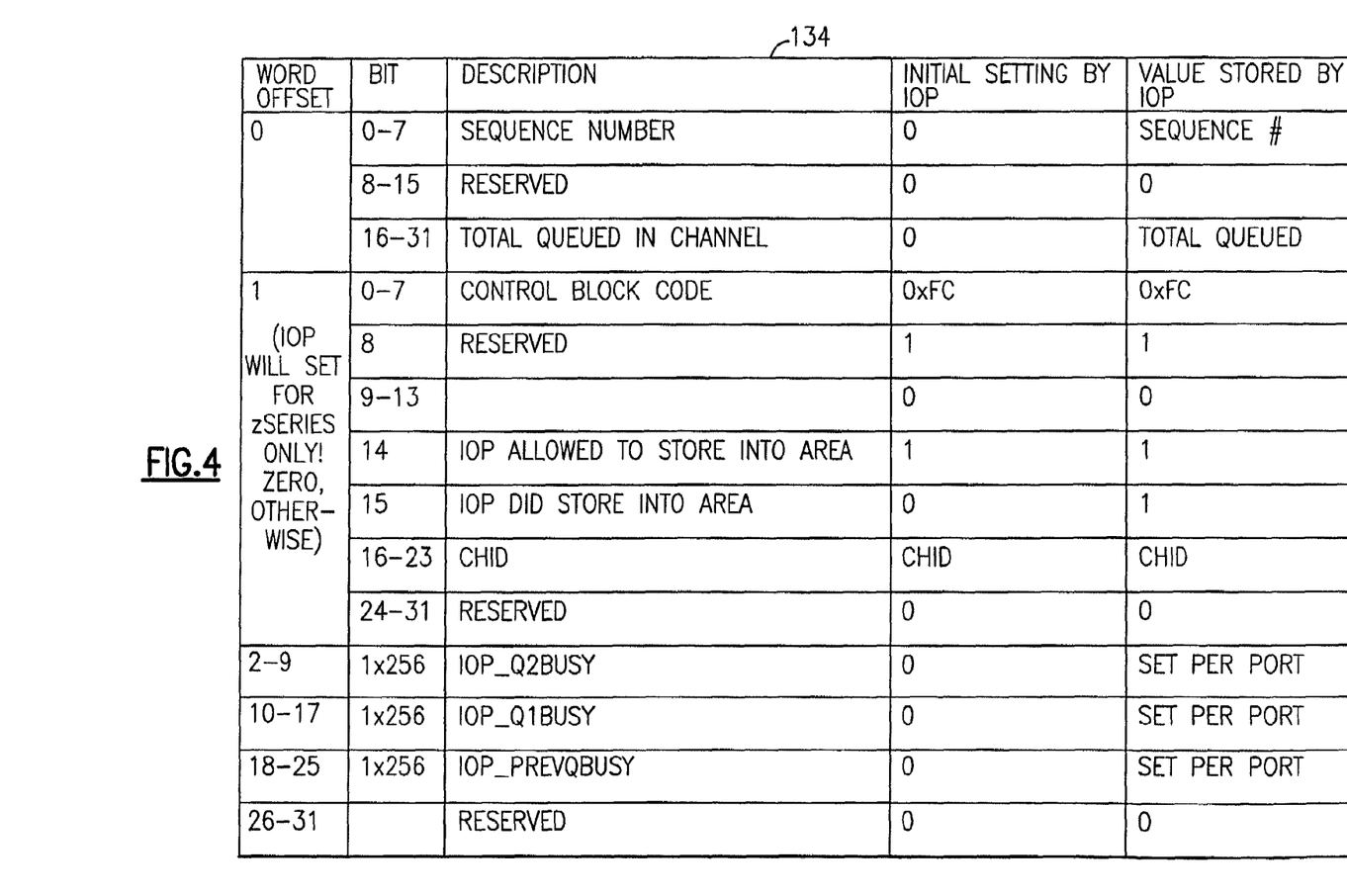
FIG. 4 is a diagram of a table for indicating the busy state of an FCV channel which is maintained by the IOP of the system of FIG. 1.
Figure 5:
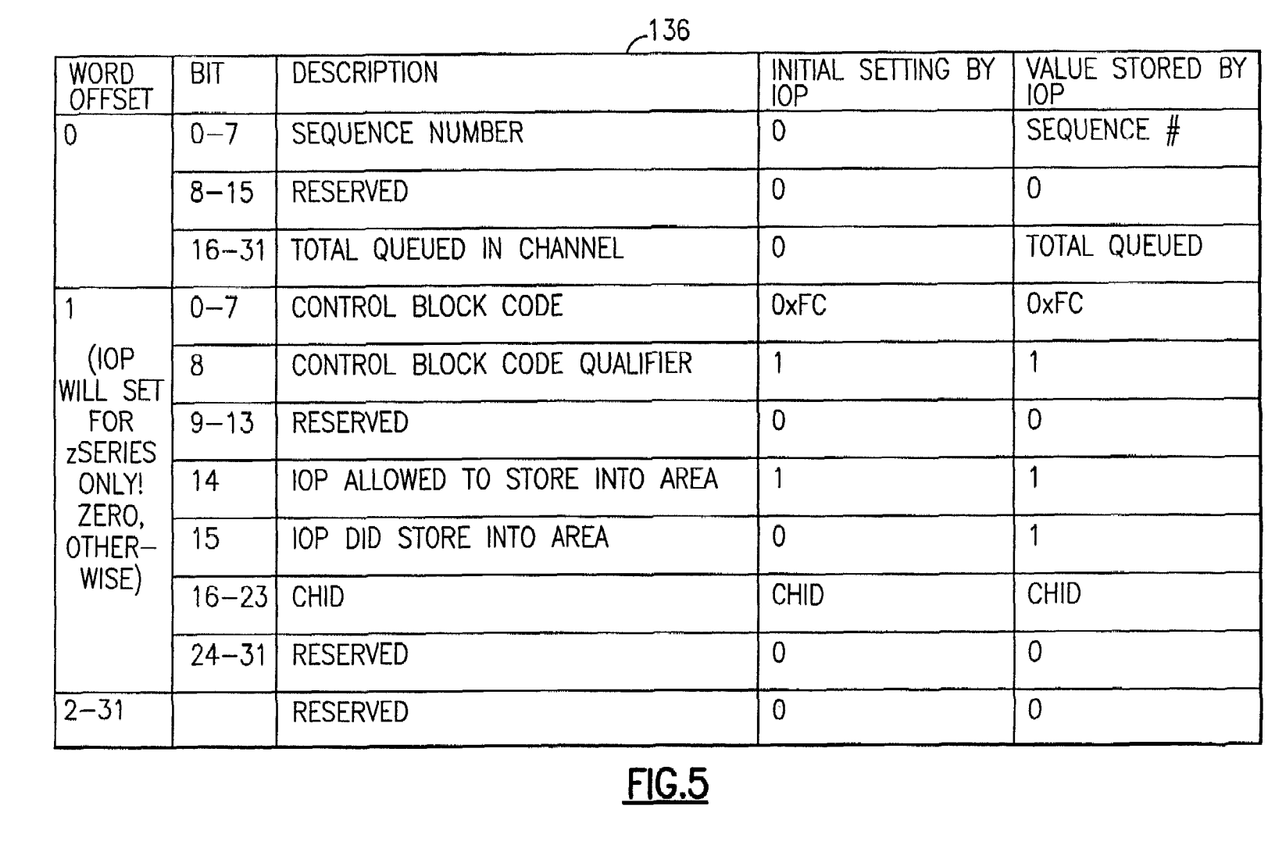
FIG. 5 is a diagram of a table for indicating the busy state on a FC channel which is maintained by the IOP of the system of FIG. 1.
Figure 6:
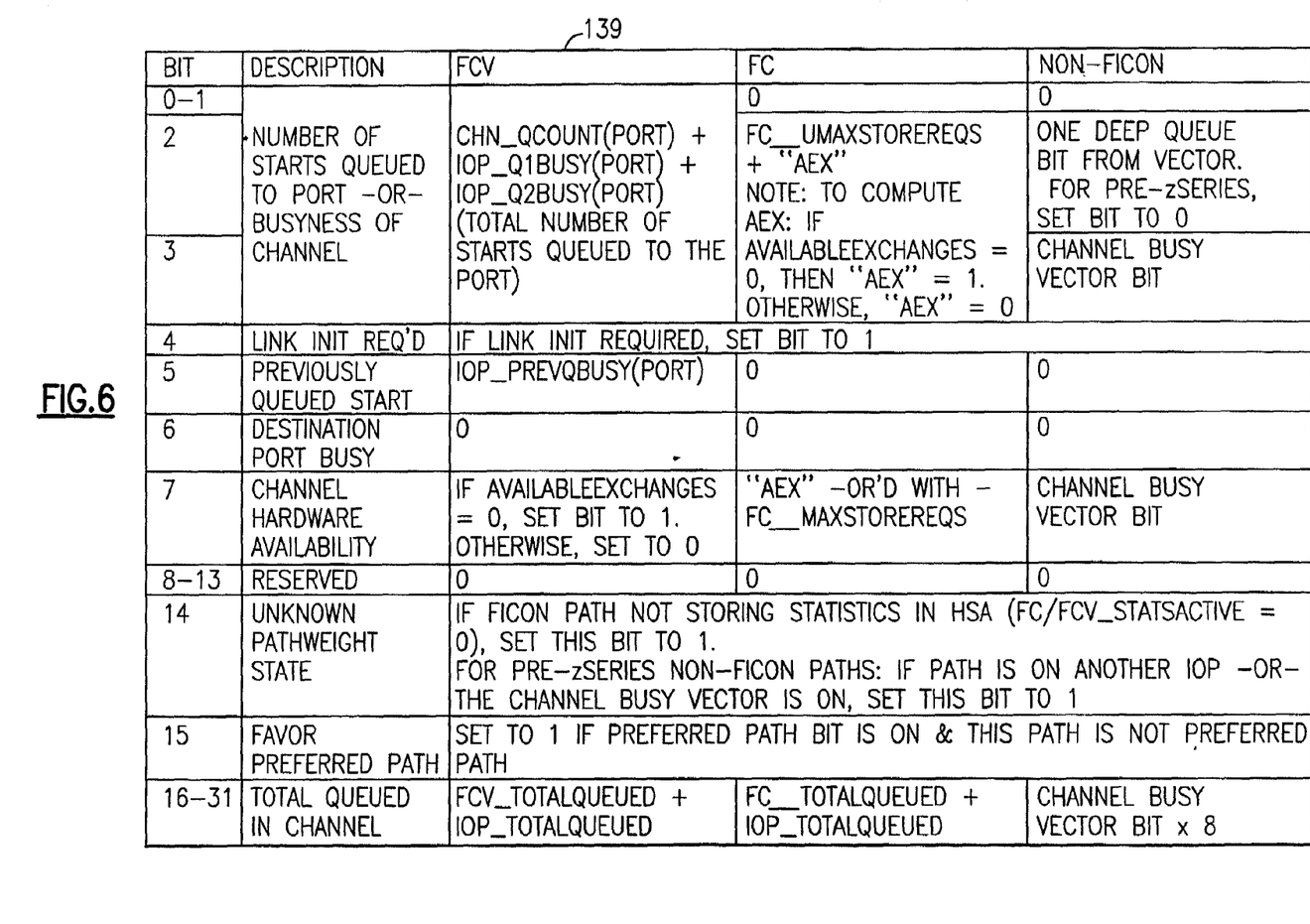
FIG. 6 is a diagram of a PathWeight table for determining the path weight of a candidate for the next path when selecting a path from a channel to a device in the system of FIG. 1.

Each channel 104 keeps a copy of the Channel Busy Data (CBD). If the channel is an ESCON channel 112, the channel keeps a busy vector 128 and a one deep queue 129. If the channel is an FCV channel 116, the FCV CBD 130 kept by the channel is shown in FIG. 2. If the channel is an FC channel 118, the FC CBD 132 kept by the channel is shown in FIG. 3. The IOP for the channels also keeps a copy of the CBD data for each channel. If the channel is an FCV channel 116, the FCV IOP copy 134 is kept as shown in FIG. 4. If the channel is an FC channel 118, the FC IOP copy 136 is kept as shown in FIG. 5. When the IOP 102 is selecting the next path to be chosen to a device 110, various path paramaters 138 are evaluated, including a PathWeight 139 which is assigned to the path by building a PathWeight Table as shown in FIG. 6, as will be explained.

The Ficon Channel Busy Statistics of CBD 130 are stored in the HSA portion of the memory of the data processing system 100 and is used in Path Selection to improve the path selection in the IOP code for the Ficon Bridge (FCV) channels by cutting down on the number of redrives as the result of channel and port busies. Port and queue busy masks are stored by the FCV channel into HSA every 1–2 milliseconds, and are referenced by the IOP 122 for path selection. The FCV channel 116 also stores the total Queue length and the Number of Available Exchanges into HSA. In a similar method, Native Ficon (FC) paths are stored by the FC channel 116 to include Total Queue length, the Number of Available Exchanges and DMA Storage Request Queue Threshold Reached Bit information into HSA for the IOP 122 to reference.

The ESCON channels 112 have a Busy Bector Bit 113 and a One Deep Queue 115. The CBD 130 includes this information for FCV channels 116, and the CBD 132 includes this infromation for FC channels 118, as will be explained.

As will be explained, PathWeighting is used to optimize Path Selection among a mix of Channel types. Since there could be a mixture of ESCON CNC, FCV and FC channels within a logical control unit 126, excessive redrives and favoritism among a mix of channel types is reduced. An algorithm, to be explained, creates a PathWeight for the path under consideration with adjustments made so it can be compared against the PathWeights of other candidates of different channel types. The PathWeights for FCV and FC channels will be created from the new HSA data mentioned above. The PathWeight Table shows how the PathWeights are created, categorized and adjusted.

A simplified One-Deep Queue design for non-FICON channels allows for reading both the Channel Busy Bit 113 and One Deep Queue Bit 115 of the channels prior to driving the Start to create a PathWeight. The PathWeight is adjusted so it can be weighted against the PathWeights of FCV and/or FC channels candidates. In addition, having the capability to determine Channel Busy Bit 113 and One Deep Bit 115 state prior to driving Starts allows for the One Deep Channel Queuing design in the IOP code to be simplified.

Catagorization of PathWeights is used to minimize path lengths in determining the PathWeight. Pathweights are divided into three categories: "Great", "OK" and "Bad". If the PathWeight indicates that the path is a "Great" candidate, the path is immediately chosen. If it is "OK", the PathWeight is compared with other path's PathWeight and the best weight is chosen. If a PathWeight is "Bad", the candidate is removed from condideration.

When a candidate is on another IOP, the algorithm minimizes re-enqueus by first examining candidates on the current IOP. Prior to the current algorithm, when an IOP determined that the next path to be considered had affinity to another IOP, the current IOP would blindly queue the subchannel on the other IOP work queue, even though other paths on the current IOP may have been available to use. Even if the state of the channel on the other IOP could be known prior to re-enqueuing the start, that path could have changed to a busy state potentially causing the problem of excessive re-enqueues to other IOPs work queues. In the present algorithm, all paths on the current IOP will be weighed first and only if all the paths on this IOP have "Bad" PathWeights will the subchannel be re-enqueued to another IOPs work queue.

In determining which other IOP's work queue to choose, work load balancing is performed among IOPs by picking a path on the least utilized IOP in determining which other IOP's work queue to choose. The present algorithm first finds the best candidate group and then picks the path within the group having affinity to the least utilized IOP. This is done by first capturing the same information (if possible) about each of the candidate paths on the other IOP's and formulating and comparing PathWeights as described above. If any "Great" candidates on other IOPs are found, it will be among this group of paths that will be used to select an IOP with the least number of elements on its work queue for the subchannel to be queued to. If there are no "Great" candidates, it will be among the "OK" candidates that will be used to select an IOP with the least number of elements on its work queue for the subchannel to be queued to.

If all the paths on all IOPs are "Bad" candidates, the IOP's work queue that has the least number of elements on it, including the IOP currently processing the Start, will be the one chosen to queue the subchannel on.

Previous CCA busies and Returned Starts are factored into Path Selection by not redriving on paths that were previously selected within the context of a Start until all other paths have been considered for path selection. It is only until all reasonable paths have been tried will the paths that had gotten CCA busy or Return/with/Lock be chosen again. This design makes use of a mask in the subchannel (SCHNBSY) to keep track of which paths were tried to drive the SSCH on.

Paths needing link initialization are weighted slightly unfavorably. Paths that are Preferred are weighted slightly favorably. However, the relative PathWeight determines whether the path is selected.

The present algorithm uses a Round Robin Path Selection of the next Start on a Logical Control Unit basis. The next path position in the Control Unit header (CNRPATH) will be set based on the Path Configured Mask for both Shared and non-shared channels. The mask in the subchannel that will be used as candidates will be the PAM rather than the current candidate mask (SCANDID). Since the SCANDID may be limited by the LPM at start up time, MVS will set the LPM to one path at path validation time, then set it to all the paths. After start up, the next start, which could be a never ending channel program could go down the same path due to what the LPM WAS on the last operation. To avoid this, the PAM is used instead of SCANDID.

If the FICON HSA Statistics are turned off or not supported by the FC or FCV channel code, the IOP Code detects this and can still perform a degree of PathWeighting in the Path Selection algorighms without HSA statistics. This is useful if code needs to be ported back to a PRE-Zseries machine without the new FICON code that updates HSA.

With all the new PathWeighing algorithms, there is no longer a need for using the Switch Busy mechanism in the IOP code for managing Port Busies and One-Deep Queue full when the channel does a Return with Lock. This solves the problem RMF is seeing of excessive Switch Busy time when Ficon Bridge is running.

L_Fibre_chn_bit Mask is expanded in LWS to allow for the determination of whether the channel is FCV, FC or OTHER. An index is also provided to help address the CBD areas in HSA.

The SCHNBSY field in the Subchannel is used to show which paths have been selected to drive the start down. At the beginning of each start, this field will be set to 0. When a path is selected, the corresponding bit will be turned on. If a bit is found on during path selection, that path will be skipped. If there are no acceptable candidates for path selection, this field will be reset to zero.

FIG. 2 is the table 130 of the new Channel Busy Data (CBD) area for FCV that the channel will store into every 1–2 millisecond and the IOP will reference (except at initialization time). Word 1 will be set as shown in the table by the IOP on zSeries machines and above. The IOP will set Word 1 to zero if run on prior machines. The channel should store Word 1 as shown in the table regardless of machine. The definition of the fields are as follows:

1. 1 Byte Sequence Number (FCV_SequenceNumber) for synchronizing Channel CBD with IOP CBD
2. 1 Byte Count of number of available, non-busy LCs (FCV AvailableExchanges). Currently, the FCV channels has up to 8 Exchanges or LCs.
3. 2 Byte Composite Count field of the total number of starts that are queued in the FCV channel. Both Start NO Return (0x09) and Start WITH Return (0x01) are included in this count (FCV_TotalQueued)
4. Control Block Code and Qualifier (to distinguish from IOP area) and CHID.
5. CHN unavailable: Field reserved for this purpose, but is currently not set. Was to be used for allowing the channel to indicate that it would not drive any work for awhile since it was busy in recovery.
6. CHN Allowed to store in area: Can be looked at at Initialization time to see if the channel should or should NOT store measurements into this area. Currently, the IOP will always set it to 1 when area initialized.
7. CHN did store into area: Lets IOP know channel did store into area (FCV_StatsActive)
8. 256×2 bit Count of the Number of starts Queued on the specified port's destination port (FCV_Qcount[ ])
9. Words 18–31: SPARE. Channel SHOULD NOT store into these just in case IOP needs the space later on.

FIG. 3 is the table 132 of the new Channel Busy Data (CBD) area for FC that the channel will store into every 1–2 millisecond and the IOP will reference (except at initialization time). Word 1 will be set as shown in the table by the IOP on Zseries machines and above. The IOP will set Word 1 to zero if run on prior machines. The channel should store Word 1 as shown in the table regardless of machine. The definitions of the fields are as follows:

1. 1 Byte Sequence Number (FC_SequenceNumber) for synchronizing Channel CBD with TOP CBD
2. 1 Byte Count of number of available, non-busy Exchanges (FC_AvailableExchanges). Currently, the FC channels has up to 32 Exchanges. The channel cannot drive any new starts if there are no available exchanges.
3. 2 Byte Composite Count field of the total number of starts that are queued in the FC channel. Both Start NO Return (0x09) and Start WITH Return (0x01) are included in this count (FC_TotalQueued)
4. Control Block Code and Qualifier (to distinguish from IOP area) and CHID.
5. CHN unavailable: Field reserved for this purpose, but is currently not set. Was to be used for allowing the channel to indicate that it would not drive any work for awhile since it was busy in recovery.
6. CHN Allowed to store in area: Can be looked at at Initialization time to see if the channel should or should NOT store measurements into this area. Currently, the IOP will always set it to 1 when area initialized.
7. CHN did store into area: Lets IOP know channel did store into area (FC_StatsActive)
8. DMA Storage Request Queue Threshold Reached Bit (was PCI High Water Mark reached) (FC_MaxStoreReqs): When 1, the channel will not drive any new starts since it has reached an arbitrary, but temporary limit that makes it impractical to drive a new I/O on the interface. When this bit is 1, the channel will just leave new starts queued in the Channel until this very temporary condition has subsided.
9. Words 2–31: SPARE. Channel SHOULD NOT store into these just in case IOP needs the space later on.

128 Bytes maintained and read by the IOP to indicate the busy state of an FCV channel during path selection for the candidate being considered:

1. 1 Byte Sequence Number for the IOP FCV Busy State Controls (IOP_SequenceNumber)
2. 2 Byte Total Queued in Channel field of starts in the IOP_Q1busy and IOP_Q2busy vectors. (IOP_TotalQueued)
3. Control Block Code 0xFC and Qualifier (to distinguish from CHN) and CHID.
4. IOP Allowed to store in area: Can be looked at at Initialization time to see if the IOP should or should NOT store measurements into this area. Currently, the IOP will always set it to 1 when area initialized.
5. IOP Storing into area: Set to 1 when IOP stores into area
6. 32 Byte IOP Channel Busy Queue for Second Start queued to port (IOP_Q2busy[ ]) Set when the IOP is queuing a second start to the specified port.
7. 32 Byte IOP Channel Busy Queue for First Start queue (IOP_Q1busy[ ]). Set when the IOP is queuing the first start to the specified port.
8. 32 Byte Previous IOP Channel Busy Queue for First Start queued (IOP_PrevQbusy[ ]).

128 Bytes maintained and read by the IOP to indicate the busy state of an FC channel during path selection for the candidate being considered:

1. 1 Byte Sequence Number for the IOP FCV Busy State Controls (IOP_SequenceNumber)
2. 2 Byte Count field of starts in the IOP_Q1busy and IOP_Q2busy vectors. (IOP_TotalQueued)
3. Control Block Code and Qualifier (to distinguish from CHN) and CHID.
4. IOP Allowed to store in area: Can be looked at at Initialization time to see if the IOP should store data into this area. (Currently, always initialized to 1)
5. IOP Storing into area: Set to 1 when IOP stores into area The algorithm for Start Selection is as follows:
1. Create the candidate list, "temp", based on the PAM, LPM, dedicated allegiance, CU busy, Device Busy and Switch Busy as is done today.
2. Prior to entering a loop to find the best candidate, use the following fields to set the OptimalPath and OptimalPathWeight (The higher the weight, the less desirable the path)
   i. Set OptimalPath=NO_OPTIMAL_PATH=0xFF (Normal Range=0→7)
   ii. Set OptimalPathWeight= MIN_PATH_WEIGHT_TO_IMMED_REJECT (=0x20000000). Doing this will cause the first allowable candidate to be set into the OptimalPath and OptimalPathWeight fields later on in design. The 2 in bits 0–3 is the MAX_STARTS_ALLOWED_INTENTIONALLY_QUEUED (=2). No more that 3 Starts can be queued to a specific destination port on an FCV chpid. Any excess will be Returned WITH Lock by the FCV channel.
3. Zero out "temp" bits for paths that have a corresponding bit on in SCHNBSY. This is because a bit on in the SCHNBSY mask indicates that the path had been previously selected and attempted to be driven and we may have gotten a Return with Lock or CCA busy causing the Start code to be re-entered for this SSCH. Thus, we want to choose other candidates before trying these paths again. (Note: The START code sets a corresponding bit on in SCHNBSY later in the code when it selects a path to drive the Start. Also, SCHNBSY is set to all zeros the first time through the start code for a new start. It also sets SCHNBSY to zeros later in the code if path selection finds no paths to select)
4. Begin looping through the "temp" candidates to find the best one to drive the start:
   i. Use SNXPATH to select starting point to find a "temp" bit on as is done today and turn the "temp" bit OFF.
   ii. If this candidate path is on another IOP:
      a. If this is the very first time through the loop -OR- the path is Byte, TPF, Dedicated Allegiance or Single Path Candidates:
         1) Set SNXPATH to that path and SNXIOP to the IOP# that the path has affinity to.
         2) Enqueue the Subchannel on that IOPs work queue and RETURN(0x07) This is what is done today.
      b. Otherwise, if not first time through loop:
         1) Set a corresponding bit in the mask "tempOtherIOP" to keep track of paths on other IOP(s).
         2) Iterate to Next Path (to top of Path Selection Loop)
   iii. Create a "PathWeight" (32 bits shown in FIG. 6) for the candidiate (see Determining the PathWeight for a Candidate below) that can be compared even in mixed channel type logical control unit configurations to be used to pick the best path.
   iv. If PathWeight<OptimalPathWeight then:
      a. OptimalPath=Path
      b. OptimalPathWeight=PathWeight
      c. If OptimalPathWeight<= MAX_PATH_WEIGHT_TO_IMMED_SELECT (=Maximum allowable weight that will cause this path to be selected without searching additional paths which is a Great Candidate. This value is: 0x0000FFFF)
         1) Leave LOOP—PICK THIS PATH!
   v. If "temp" ^=0, Iterate to next Path in Path Selection Loop
5. If OptimalPath ^=NO_OPTIMAL_PATH: (Path on THIS IOP OK!!)
   i. If Link Initialization needs to be done for the OptimalPath (PATHWEIGHT_LINKINITREQ bit is on), then Initiate Link Initialization and RETURN (0x08 for Byte, TPF, Single Pather -or- 0x09 for Multipather)
   ii. Set bit in SCHNBSY to indicate Start will be attempted on this path.
   iii. if OptimalPathWeight<= MAX_PATH_WEIGHT_TO_IMMED_SELECT then incr_cnt (0x01). Otherwise, incr_cnt(0x07).
   iv. Set Next Path index in CU-Hdr, next path in SCB and Next IOP field in SCB:
      a. Increment CNRPATH to Next Valid Path in CU-Hdr based on the Path Configured Mask. The idea here is only look at paths that are Online. Otherwise, if you don't, subsequent increments of CNRPATH could have caused SNXPATH to keep pointing to the same path. For example, if you blindly increment CNRPATH and you take the case of say 2 paths to a CU (SPIM=0xC0), SNXPATH would have ended up the same for CNRPATH 0, 2 thru 7. Also, use the Path Configured Mask rather than the PIM (for Shared channels) because chances are that if a PAM bit is off, it is off in all images due to the channel being taken out of service rather than from a specific image.
      b. Set SNXPATH=Most significant bit (MSB) based on the PAM starting from CNRPATH. When selecting the next path, the PAM is used insead of SCANDID. The thinking here is that SCANDID may be limited by the LPM at start up time. MVS will set the LPM to one path at path validation time. MVS will then set the LPM to all the paths. The danger would be that after start up, the next start, which could be a never ending channel program could go down the path same path due to what the LPM WAS on the last operation. Thus, to avoid this, the PAM is used instead of SCANDID.
      c. Set SNXIOP based on SNXPATH.
   v. Write the CCA with: "Start No Return" if Byte, TPF or Single Path Candidates. "Start WITH Return" if Multipather.
      Note: The Channel will always queue the Start WITH Return (0x01) Command. Thus, no need for the modifier.
      a. If CCA write was successful:
         1) For FCV:
            i) If IOP_Q1busy(port)=0, Set IOP_Q1busy (port)=1
            ii) Else, IOP_Q2busy(port)=1
            iii)Increment IOP_TotalQueued
         2) For FC:
            i) Increment IOP_TotalQueued
         3) For non-FCV:
            i) Nothing extra to do
      b. Else, if CCA write was not successful:
         1) Do what is done today . . . the SNXIOP will be used to put the start on the correct IOP's queue and RETURN with appropriate RC.
6. If OptimalPath=NO_OPTIMAL_PATH, then a viable candidate path having affinity to this IOP has not been found. The code will then examine candidates with affinity to other IOPs. The "tempOtherIOP" mask that the algorithm had set while going through the initial "temp" loop, will now be used to point to candidates having affinity to other IOPs. If any bits are on in this tempOtherIOP mask, the code will now enter a loop to first determine the best class of available candidates (Great or OK candidate), then from that class pick the candidate that has affinity to an IOP with the least number of elements on its IOP Work Queue.
  i. Select a path based on "tempOtherIOP" and then turn off the corresponding bit in this mask
  ii. Create a "PathWeight" (32 bits shown in FIG. 6) for the candidate (see Determining the PathWeight for a Candidate below)
  iii. If PathWeight indicates a "Bad Candidate", Iterate in loop to Next Candidate.
  iv. Else, If PathWeight<= MAX_PATH_WEIGHT_TO_IMMED_SELECT, then a "Great Candidate" path has been found, then:
    a. If the Number of Elements on this IOP's Work Queue for which this candidate channel has affinity<OptimalIOPWeight -OR- If this is the first "Great Candidate" found in this loop thus far, then:
      1) OptimalPath=This path
      2) OptimalIOP=The IOP number that the path has affinity to
      3) OptimalIOPWeight=Number of Elements on the OptimalIOP's Work Queue.
      4) From now on in the Loop, compare OptimalIOPWeight to only the IOP Work Queue Sizes of other "Great Candidates"
  v. Else, If No "Great Candidates" have been found so far and this PathWeight indicates an "OK Candidate", set OptimalPath, OptimalIOP and OptimalIOPWeight as done in the previous steps
  vi. Leave loop if "tempOtherIOP"=0. Otherwise continue in this loop
7. If OptimalPath ^=NO_OPTIMAL_PATH: (Path on ANOTHER IOP OK!!)
  i. Set SNXPATH=OptimalPath and SNXIOP= OptimalIOPNum
  ii. Put SCB on the bottom of that IOP's Work Queue based on SNXIOP
  iii. RETURN(0x0B) (Candidate on another IOP)
8. If OptimalPath=NO_OPTIMAL_PATH: (NO good PATHS on any IOPs)
  i. Zero out all bits in SCHNBSY
  ii. Using the inital list of candidate paths for this subchannel, enter a loop to examine the IOP Work Queue Lengths of IOPs having affinity to these candidate paths. Determine which of these IOP has the least number of elements on its IOP Work Queue. Set SNXIOP to the IOP with the least number of elements on its Work Queue and set SNXPATH to the candidate path having affinity to the IOP.
  iii. Put SCB back on the SNXIOP Work Queue
  iv. RETURN(0x0C) (if SCNHBSY WAS zero) or RETURN(0x0A) otheriwise The Algorithm for Determining the PathWeight for a candidate is as follows:
  i. For Byte, TPF, Dedicated Allegiance or Single Path Candidates:
    a. Set the PathWeight to 0 if it does not need link initialization. If it needs link initialization, set PathWeight to PATHWEIGHT_LINKINITREQ (0x08000000).
    b. Return with PathWeight.
  ii. If the path is FCV or FC, before any further assessment can be made with regards to the path, the Busy State data in the system area will need to be examined and updated if necessary. (See Gathering Channel Busy States from System Area below.) (HSA)
  iii. Create a "PathWeight" word (32 bits) for the candidiate based on the guidelines in the following table in Section PathWeight Table that follows.
    FOR PRE-zSeries machines that don't have capability to read One Deep Queue Bit, assume the One Deep Queue is empty. However, if the channel is Busy or the code is looking at paths on another IOP, add a slightly unfavorable factor to the PathWeight (done later on when determining the PathWeight).
    NOTE: If this path is clearly not a good candidate for selection, the code may choose to take a short cut by setting a "Bad" PathWeight without computing the full PathWeight by following the algoithms that follow. Here are the conditions for setting an immediate "Bad PathWeight":
      a. For Non-FICON: Read Channel Busy/One Deep Queue Vector
        1) One Deep Queue is Busy
      b. For Ficon Bridge (FCV):
        1) FCV_Qcount(port)+IOP_Q1busy(port)+IOP_Q2busy(port)>=MAX_STARTS_ALLOWED_INTENTIONALLY_QUEUED (=2)
      c. For Native Ficon (FC):
        1) Storage Request Threshold Reached (FC_MaxStoreReqs=1) AND"ed withNo Exchanges left (FC_AvailableExchanges=0)
  iv. Return with PathWeight For Gathering Channel Busy States from System Area, if the FCV or FC channel is storing statistics (FCV or FC_StatsActive=1) then the following algorithms for each type channel apply. Otherwise, treat resulting values as zero when determining the PathWeight (except as noted in the PathWeight Table of FIG. 6)

For FCV paths with affinity to this IOP, the following algorithm will examine stored values for the channel path and make adjustments if necessary. It will allow up to 2 starts to be queued for the specified destination port. This is controlled by setting MAX_STARTS_ALLOWED_INTENTIONALLY_QUEUED (Currently set to 2). The algorithm is:
  i. IF IOP_SequenceNumber ^=FCV_SequenceNumber:
    a. IF IOP_SequenceNumber+1=FCV_SequenceNumber then: (CBV is one millisecond tick ahead of local IOP vector):
      1) IOP_PrevQbusy(0:255)=IOP_Q1busy(0:255)
    b. ELSE (difference in sequence Nunbers is greater than a 1 millisec tick):
      1) IOP_PrevQbusy(0:255)=0
    c. Reset Vectors/Counts/SeqNumber:
      1) IOP_Q1busy(0:255)=0
      2) IOP_Q2busy(0:255)=0
      3) IOP_TotalQueued=0
      4) IOP_SequenceNumber=FCV_SequenceNumber
  ii. Otherwise, use data as is.

For FC paths with affinity to this IOP, the following algorithm applies:
  i. IF IOP_SequenceNumber ^=FC_SequenceNumber:
    a. Reset Vectors/Counts/SeqNumber:
      1) IOP_TotalQueued=0
      2) IOP_SequenceNumber=FC_SequenceNumber
  ii. Otherwise, use data as is.

For FCV Paths on Another IOP (When looping on "tempOtherIOP" bits), the following algorithm applies:
  i. IF IOP_SequenceNumber ^=FCV_SequenceNumber:
    a. IF IOP_SequenceNumber+1=FCV_SequenceNumber then: (CBV is one millisecond tick ahead of local IOP vector):
      1) Treat IOP_PrevQbusy(0:255) as equal to IOP_Q1busy(0:255)
    b. ELSE (difference in sequence Nunbers is greater than a 1 millisec tick):
      1) Treat IOP_PrevQbusy(0:255) as equal to 0
    c. Vectors/Counts:
      1) Treat IOP_Q1busy(0:255) as if equal to 0
      2) Treat IOP_Q2busy(0:255) as if equal to 0
      3) Treat IOP_TotalQueued as if equal to 0
  ii. Otherwise, use data as is.

For FC Paths on Another IOP (When looping on "tempOtherIOP" bits), the following algorithm applies:
  i. IF IOP_SequenceNumber ^=FC_SequenceNumber:
    a. Treat FC_TotalQueued as if equal to 0
  ii. Otherwise, use data as is.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. An apparatus comprising:
   a main memory for storing data;
   one or more I/O devices for receiving data from or sending data to said main memory;
   a control unit for controlling said I/O devices;
   at least one I/O processor (IOP) for controlling I/O operations for sending data between said main memory and said I/O devices;
   a plurality of channels between said IOP and said control unit, said channels including multiple channel paths for carrying data between said main memory and said I/O devices during said I/O operations, said channels including at least one enterprise system connection (ESCON) channel, at least one Ficon Bridge (FCV) channel, and at least one Ficon Native channel (FC), each channel keeping a copy of channel busy data (CBD), said IOP keeping a copy of the CBD for each channel, said ESCON channel keeping a busy vector and a one deep queue full vector, said FC channel keeping DMA thresholds, number of exchanges, and queue totals; and
   a computer program executed by said IOP for selecting one of said channel paths as the next channel path to carry data between said main memory and said I/O devices, said computer program determining a path weight, said path weight being assigned to a path by building a path weight table, said path weight being adjusted to enable comparison between different types of channels, said path weight being based on said busy vector and said one deep queue full vector for said ESCON channel, said path weight being based on said DMA thresholds, said number of exchanges, and said queue totals for said FC channel;
   wherein each said channel has an affinity to one of said IOP.

2. The apparatus of claim 1 wherein said computer program classes a channel path candidate as a great candidate, a bad candidate, or an OK candidate dependent on the value of the given channel path's path weight value, said computer program further including an algorithm for selecting the channel path candidate to initiate the I/O operation on if it is classed as a great candidate, evaluating time next candidate if it is classed as an OK channel path or a bad channel path, or selecting the OK candidate with the least path weight to initiate the I/O operation on if there are no great candidates found while rejecting any bad candidates.

3. The apparatus of claim 2 further comprising multiple IOPs, a work queue having work elements for each TOP, and said computer program comprises a loop for determining the best class of available candidates, and from that class picking the candidate that has affinity to the IOP with the least number of work elements on its work queue.

4. A data processing system having a main memory for storing data, one or more I/O devices for receiving data from or sending data to said main memory, and an I/O processor (TOP) for controlling I/O operations for sending data between said main memory and said I/O devices, an apparatus for selecting paths between the main memory and the I/O devices comprising:
   at least one channel between the IOP and the I/O devices, said channels including multiple channel paths for carrying data between the main memory and the I/O devices during the I/O operations, said channel including more than one type of channel; and
   a plurality of channels between said IOP and said control unit, said channels including multiple channel paths for carrying data between said main memory and said I/O devices during said I/O operations, said channels including at least one enterprise system connection (ESCON) channel, at least one Ficon Bridge (FCV) channel, and at least one Ficon Native channel (FC), each channel keeping a copy of channel busy data (CBD), said IOP keeping a copy of the CBD for each channel, said ESCON channel keeping a busy vector and a one deep queue full vector, said FC channel keeping DMA thresholds, number of exchanges, and queue totals; and
   a computer program executed by said IOP for selecting one of said channel paths as the next channel path to carry data between said main memory and said I/O devices, said computer program determining a path weight, said path weight being assigned to a path by building a path weight table, said path weight being adjusted to enable comparison between different types of channels, said path weight being based on said busy vector and said one deep queue full vector for said ESCON channel, said path weight being based on said DMA thresholds, said number of exchanges, and said queue totals for said FC channel;
   wherein each said channel has an affinity to one of said IOP.

5. The apparatus of claim 4 wherein said computer program classes a channel path candidate as a great candidate, a bad candidate, or an OK candidate dependent on the value of the given channel path's path weight value, said computer program further including an algorithm for selecting the channel path candidate to initiate the I/O operation on if it is classed as a great candidate, evaluating the next candidate if it is classed as an OK channel path or a bad channel path, or selecting the OK candidate with the least path weight to initiate the I/O operation on if there are no great candidates found while rejecting any bad candidates.

6. The apparatus of claim 5 further comprising multiple IOPS, a work queue having work elements for each IOP, and said computer program comprises a loop for determining the best class of available candidates, and from that class picking the candidate that has affinity to the IOP with the least number of work elements on its work queue.

7. A method for selecting channel paths in a data processing system having a main memory for storing data, one or more I/O devices for receiving data from or sending data to said main memory, an I/O processor (IOP) for controlling I/O operations for sending data between said main memory and said I/O devices, and disparate channels between the IOP and the I/O devices, said disparate channels including multiple channel paths for carrying data between the main memory and the I/O devices during the I/O operations, said disparate channels including at least one enterprise system connection (ESCON) channel, at least one Ficon Bridge (FCV) channel, and at least one Ficon Native channel (FC), each channel keeping a copy of channel busy data (CBD), said IOP keeping a copy of the CBD for each channel, said ESCON channel keeping a busy vector and a one deep queue full vector, said FC channel keeping DMA thresholds, number of exchanges, and queue totals, said method comprising:

assigning a path weight to selected ones of said channel paths; said path weight being assigned to a path by building a path weight table, said path weight being adjusted to enable comparison between different types of channels, said path weight being based on said busy vector and said one deep queue full vector for said ESCON channel, said path weight being based on said DMA thresholds, said number of exchanges, and said queue totals for said FC channel; and selecting the next channel path to carry data between said main memory and said I/O devices based on said path weight;

wherein each said channel has an affinity to one of said IOP.

8. The method of claim 7 further comprising:

classifying a channel path candidate as a great candidate, a bad candidate, or an OK candidate dependent on the value of the given channel path's path weight value; and selecting the channel path candidate to initiate the I/O operation on if it is classed as a great candidate, evaluating the next candidate if it is classed as an OK channel path or a bad channel path, or selecting the OK candidate with the least path weight to initiate the I/O operation on if there are no great candidates found while rejecting any bad candidates.

9. The method of claim 8 wherein said data processing system includes multiple IOPs, a work queue having work elements for each IOP, and said method further comprises:

performing a loop for determining the best class of available candidates; and from that class, picking the candidate that has affinity to the IOP with the least number of work elements on its work queue.

10. A program product usable with in a data processing system having a main memory for storing data, one or more I/O devices for receiving data from or sending data to said main memory, an I/O processor (IOP) for controlling I/O operations for sending data between said main memory and said I/O devices, and disparate channels between the IOP and the I/O devices, said disparate channels including multiple channel paths for carrying data between the main memory and the I/O devices during the I/O operations, said disparate channels including at least one enterprise system connection (ESCON) channel, at least one Ficon Bridge (FCV) channel, and at least one Ficon Native channel (FC), each channel keeping a copy of channel busy data (CBD), said IOP keeping a copy of the CBD for each channel, said ESCON channel keeping a busy vector and a one deep queue full vector, said FC channel keeping DMA thresholds, number of exchanges, and queue totals, said program product comprising:

A computer readable medium having recorded thereon computer readable program code means for performing the method comprising:

assigning a path weight to selected ones of said channel paths, said path weight being assigned to a path by building a path weight table, said path weight being adjusted to enable comparison between different types of channels, said path weight being based on said busy vector and said one deep queue full vector for said ESCON channel, said path weight being based on said DMA thresholds, said number of exchanges, and said queue totals for said FC channel; and selecting the next channel path to carry data between said main memory and said I/O devices based on said path weight;

wherein each said channel has an affinity to one of said IOP.

11. The program product of claim 10 wherein said method further comprises:

classifying a channel path candidate as a great candidate, a bad candidate, or an OK candidate dependent on the value of the given channel path's path weight value; and selecting the channel path candidate to initiate the I/O operation on if it is classed as a great candidate, evaluating the next candidate if it is classed as an OK channel path or a bad channel path, or selecting the OK candidate with the least path weight to initiate the I/O operation on if there are no great candidates found while rejecting any bad candidates.

12. The program product of claim 11 wherein said data processing system includes multiple IOPs, a work queue having work elements for each IOP, and said method further comprises:

performing a loop for determining the best class of available candidates; and from that class, picking the candidate that has affinity to the IOP with the least number of work elements on its work queue.

* * * * *